(12) United States Patent
Hrle et al.

(10) Patent No.: US 7,552,110 B2
(45) Date of Patent: Jun. 23, 2009

(54) METHOD FOR PERFORMING A QUERY IN A COMPUTER SYSTEM TO RETRIEVE DATA FROM A DATABASE

(75) Inventors: Namik Hrle, Boeblingen (DE); Johannes Schuetzner, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 376 days.

(21) Appl. No.: 10/947,611

(22) Filed: Sep. 22, 2004

(65) Prior Publication Data
US 2005/0065921 A1 Mar. 24, 2005

(30) Foreign Application Priority Data
Sep. 22, 2003 (EP) .................... 03103504

(51) Int. Cl.
*G06F 7/00* (2006.01)
*G06F 17/30* (2006.01)
(52) U.S. Cl. .................. 707/3; 707/1; 707/2; 707/4; 707/5
(58) Field of Classification Search ................ 707/102, 707/1–6, 100, 200
See application file for complete search history.

(56) References Cited

U.S. PATENT DOCUMENTS

| 5,412,806 | A * | 5/1995 | Du et al. ................ 707/2 |
| 5,940,819 | A * | 8/1999 | Beavin et al. ........... 707/2 |
| 6,356,889 | B1 * | 3/2002 | Lohman et al. .......... 707/2 |
| 6,847,978 | B2 * | 1/2005 | Ellis et al. ............ 707/102 |
| 7,080,062 | B1 * | 7/2006 | Leung et al. ............ 707/2 |
| 7,146,363 | B2 * | 12/2006 | Waas et al. ............. 707/6 |
| 2002/0198867 | A1 * | 12/2002 | Lohman et al. .......... 707/3 |
| 2004/0122804 | A1 * | 6/2004 | Zhang et al. ........... 707/3 |
| 2005/0125427 | A1 * | 6/2005 | Dageville et al. ....... 707/100 |

OTHER PUBLICATIONS

Goldstein et al., "Optimizing Queries Using Materialized Views: A Practical, Scalable Solution", AMC SIGMOD Record, vol. 30, Issue 2, Jun. 2001, pp. 331-342. Downlowad: http://portal.acm.org/citation.cfm?id=376284.375706.*

Selinger et al., "Access Path Election in a Relational Database Management System", International Conference on Management of Data archive Proceedings of the 1979 ACM SIGMOD international conference on Management of data, 1979. pp. 23-34. Download: http://portal.acm.org/citation.cfm?id=582099.*

(Continued)

*Primary Examiner*—John E Breene
*Assistant Examiner*—Hares Jami
(74) *Attorney, Agent, or Firm*—Kunzler & McKenzie

(57) ABSTRACT

Presented is a method to perform a query to retrieve data from a database that is part of a computer system comprising a Data-Base Management System (DBMS) with an optimizer. A Query Execution Plan (QEP) is generated for the query. The QEP is assessed by considering statistical values about previous executions of the query according to the QEP to decide whether to choose the QEP or to generate a new QEP. Furthermore, the statistical values on previous executions of the query are exploited during query optimization. The query is executed according to the chosen QEP. For optimizing the execution of future queries, statistical values about the execution of the query are collected during execution.

13 Claims, 3 Drawing Sheets

OTHER PUBLICATIONS

Subramanian et al., "Cost-Based Optimization of Decision Support Queries using Transient-Views", International Conference on Management of Data archive Proceedings of the 1998 ACM SIGMOD, Seattle, Washington, United States, 1998. pp. 319-330. Download: http://portal.acm.org/citation.cfm?id=276333.*

Ng et al., "Dynamic Query Re-Optimization," Proceedings of the 11th International Conference on Scientific on Scientific and Statistical Database Management, 1999.

Weikum et al., "Self-tuning Database Technology and Information Services: from Wishful Thinking to Viable Engineering," Proceedings of the 28th VLDB Conference, Hong Kong, China, 2002.

* cited by examiner

US 7,552,110 B2

METHOD FOR PERFORMING A QUERY IN A COMPUTER SYSTEM TO RETRIEVE DATA FROM A DATABASE

PRIORITY CLAIM

The present application claims the priority of European patent application, Serial No. 03103504.1, titled "Method and Device for Performing a Query in a Computer System to Retrieve Data from a Database," which was filed on Sep. 22, 2003, and which is incorporated herein by reference.

FIELD OF THE INVENTION

The present invention relates in general to database management systems performed by computers, and in particular, to learning from empirical results in query optimization. Particularly, the present invention relates to a method and a computer system for performing a query to retrieve data from a database stored on the computer system.

BACKGROUND OF THE INVENTION

Computer systems incorporating Data-Base Management System (DBMS) software using a Structured Query Language (SQL) interface are well known in the art. In a DBMS system, queries typically specify what data is to be accessed, rather than how that data is to be accessed. An SQL Query compiler, and specifically an optimizer function of the SQL Query compiler, automatically determines the appropriate way to access and process the data referenced in a single query or SQL statement respectively. In any case, the access path or Query Execution Plan (QEP) respectively has to be determined before an SQL statement can be executed. The determination of access paths is also known as statement preparation or query optimization.

The optimizer function of the SQL query compiler aims at optimal access paths with minimal execution time. There are approaches, well known in the art, that exploit different statistics to optimize an access path such as object statistics (e.g., table size, cardinality of table columns, value distribution of table columns, etc.) and system statistics (e.g., processor speed, disk I/O latency, buffer pool characteristics for buffer pools that support relevant tables, etc.).

SQL statements are prepared either statically or dynamically. To enhance performance, database systems usually cache dynamically-prepared SQL statements in the so called dynamic statement cache (DSC), which resides in main memory. Thus, these cache dynamically-prepared SQL statements can be executed repeatedly using the same access path.

However, access paths determined by the optimizer function of an SQL Query compiler are not necessarily optimal, because the optimizer function might base its decisions on information that is outdated. Also, a QEP that was optimal when generated may deteriorate due to the growth or shrinkage of accessed tables. Once an access path has been established, it is difficult to automatically assess an optimal point at which an old QEP is replaced by a new QEP. If new QEPs are generated too often, computing resources are wasted during the superfluous QEP generations. Likewise, if suboptimal QEPs are not replaced with better QEPs, computing resources are wasted during the executions of these suboptimal QEPs.

Weikum, et al., describe in "Self-tuning Database Technology and Information Service: from Wishful Thinking to Viable Engineering", Proceedings of the 28th VLDB Conference, Hong Kong, 2002, an approach that exploits database performance statistics to adjust global DBMS parameters. These adjustments affect the behavior of the entire DBMS, potentially resulting in deterioration of well-performing SQL statements. Further, these adjustments do not enhance the statistical information of the optimizer function.

Another approach as described by Ng, et al., in "Dynamic Query Re-Optimization", the 11th International Conference on Scientific and Statistical Database Management, Cleveland, Ohio, 1999, provides a general framework for triggering re-optimization. However, this approach neither enhances the statistical information nor considers the repeatable execution of the same SQL statement. Rather, this approach aims at the dynamic re-optimization of parts of a query but does not save and exploit this knowledge for the following query optimization runs.

U.S. 2002/0198867 A1 by Lohman, et. al., titled "Learning from Empirical Results in Query Optimization," describes an optimizer function of a DBMS that generates alternative QEPs for executing a query. For each of the alternative QEPs an execution model is provided. One of the alternative QEPs is chosen for execution based on the model associated therewith. The optimizer function uses, for example, the base table cardinality, as stored in the statistics, in its cardinality estimation model to compute an estimate for the result cardinality of each table access operator after application of the predicate. Besides, the comparable actual cardinality is measured for each operator during execution.

The actual and estimated cardinalities are compared to obtain a feedback to the statistics that were used for obtaining the base table cardinalities as well as a feedback to the cardinality model that was used for computing the estimates. Thus, the optimizer function exploits an empirical measurement from the execution of the chosen QEP to validate the model associated therewith. Thereby, the optimizer function determines whether the model is in error and in that case one or more adjustments to the model are computed to correct the determined error.

The estimates of the optimizer function concerning table characteristics are validated. Therefore, actually measured table characteristics such as value distributions in table columns or the number of rows are compared with estimates for these characteristics which were used when choosing a QEP for execution. Although this technology has proven to be useful, it would be desirable to present additional improvements.

What is therefore needed is a system, a computer program product, and an associated method for an optimizer function that learns from previous executions of an SQL query to exploit and enhance system statistics. The need for such a solution has heretofore remained unsatisfied.

SUMMARY OF THE INVENTION

The present invention satisfies this need, and presents a system, a computer program product, and an associated method (collectively referred to herein as "the system" or "the present system") for performing a query to retrieve data from a database stored on a computer system in such a manner that allows an optimizer function to learn from previous executions of the query.

According to the present invention, a method and a computer system are provided for performing a query to retrieve data from a database stored on the computer system that comprises a Data-Base Management System (DBMS) with an optimizer. The method comprises generating a Query Execution Plan (QEP) for the query, assessing the QEP by considering statistical values about previous executions of the query according to the QEP, deciding whether to choose the QEP or to generate a new QEP, executing the query according to the chosen QEP, and collecting statistical values during execution for optimizing the execution of future queries. Correspondingly, the apparatus comprises a logic, performed by the computer system, for generating a QEP for the query, for assessing the QEP by considering statistical values about previous executions of the query according to the QEP, for deciding whether to choose the QEP or to generate a new QEP, for executing the query according to the chosen QEP, and for collecting statistical values during execution for optimizing the execution of future queries.

The regeneration of QEPs when necessary by the present system considers the execution statistics of SQL statements. Thus, the optimizer function being equipped with execution statistics is able to learn from previous executions of an SQL statement. The present system enhances the query optimization process by triggering re-optimization at an appropriate time and by providing statement execution statistics comprising more accurate and more detailed system statistics. For a given SQL statement, the present system considers only the statistics of the previous executions of the given SQL statement. Hence, before each execution of a given SQL statement, the statistics gathered thus far concerning the given SQL statement are evaluated. When the statistics indicate non-satisfactory performance of the given SQL statement, re-optimization is triggered.

In one embodiment of the present invention, the DBMS comprises an assessment formula for assessment of a QEP. In this case, the assessment can easily be performed by feeding the collected statistical values about previous executions of the corresponding query according to the QEP into the assessment formula. Good results have been obtained in assessing the quality of access paths by using the ratio (# of rows examined/# of qualifying rows), (# Getpages aggregate function/# of qualifying rows), or (# of qualifying rows/# of qualifying rows after). The number of examined rows is the number of rows that are evaluated to check whether the rows qualify according to the query predicates. The number of qualifying rows is the number of rows that actually qualify and thus contribute to the result set. For queries with aggregate functions such as GROUP BY, every row that is considered during aggregation is counted to the number of qualifying rows before aggregation takes place. The number of getpage operations counts the number of pages on which data rows reside that are read to find the qualifying rows. The number of qualifying rows after the application of aggregate functions counts the rows that qualify according to the query predicates and that have already been aggregated according to the aggregate functions in the query. These statistical values can easily be collected during execution of an SQL statement. If predefined thresholds for these ratios are exceeded, the QEP is invalidated.

In order to be able to exploit the statement statistics during query re-optimization and to further allow the identification of trends and the effect of access path changes, the present system persistently stores the execution statistics of past executions. In one embodiment of the present system, the statistical values about the execution of a query according to a QEP are collected in main memory as long as to the present system has not invalidated the QEP for the query. Before each re-optimization or invalidation of the QEP, the accumulated statistics are externalized in an initially created execution statistics history table while the statistics in main memory are reset and the collection process starts over. In this context, it is advantageous to store the statement text of the query and/or a description of the QEP together with the corresponding accumulated statistical values in order to allow the correlation of the execution statistics with future statements and to associate execution statistics with QEPs. During generation of a new QEP, the statement statistics that are available for a query in the execution statistics history table are fed into the optimizer's cost formula.

In another embodiment of the present invention, the present system assesses the result of re-optimization (i. e., the generated new QEP) by considering the execution statistics that exist for this QEP. If the newly proposed access path does not promise adequate performance according to the execution statistics, the present system combines the execution statistics with information on the existing database objects to automatically define new indexes or Materialized Query Tables (MQTs) that enable a better access path. The present system creates these indexes or MQTs using approaches well known in the art.

The present invention proposes a method and a device for performing a query to retrieve data from a database stored on a computer system, wherein the scope of the access path re-optimization is targeted at the problem statement only and does not deteriorate the performance of other statements or system resources. Moreover, the present system inherently provides a good projection of the past behavior into the future. In general it is not easy to predict a future work load; these predictions require sophisticated mathematical models which themselves are in need of computing resources. However, the approach according to the present system is easy to accomplish and straightforward. As a large portion of the SQL statements of applications are executed in similar circumstances, the characteristics of the past executions are very likely identical to the future executions.

Additionally, the present system automatically detects when to re-optimize a query and can provide necessary indexes and MQTs. By including the construction of required indexes and MQTs in the process, the present system behaves autonomously. Again, statement execution statistics serve to assess whether a new index or MQT is required. Consequently, the number of previous executions can be used to evaluate whether a statement is worth a new index or MQT. The present system lessens the burden of database administrators who today often perform these tasks manually.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
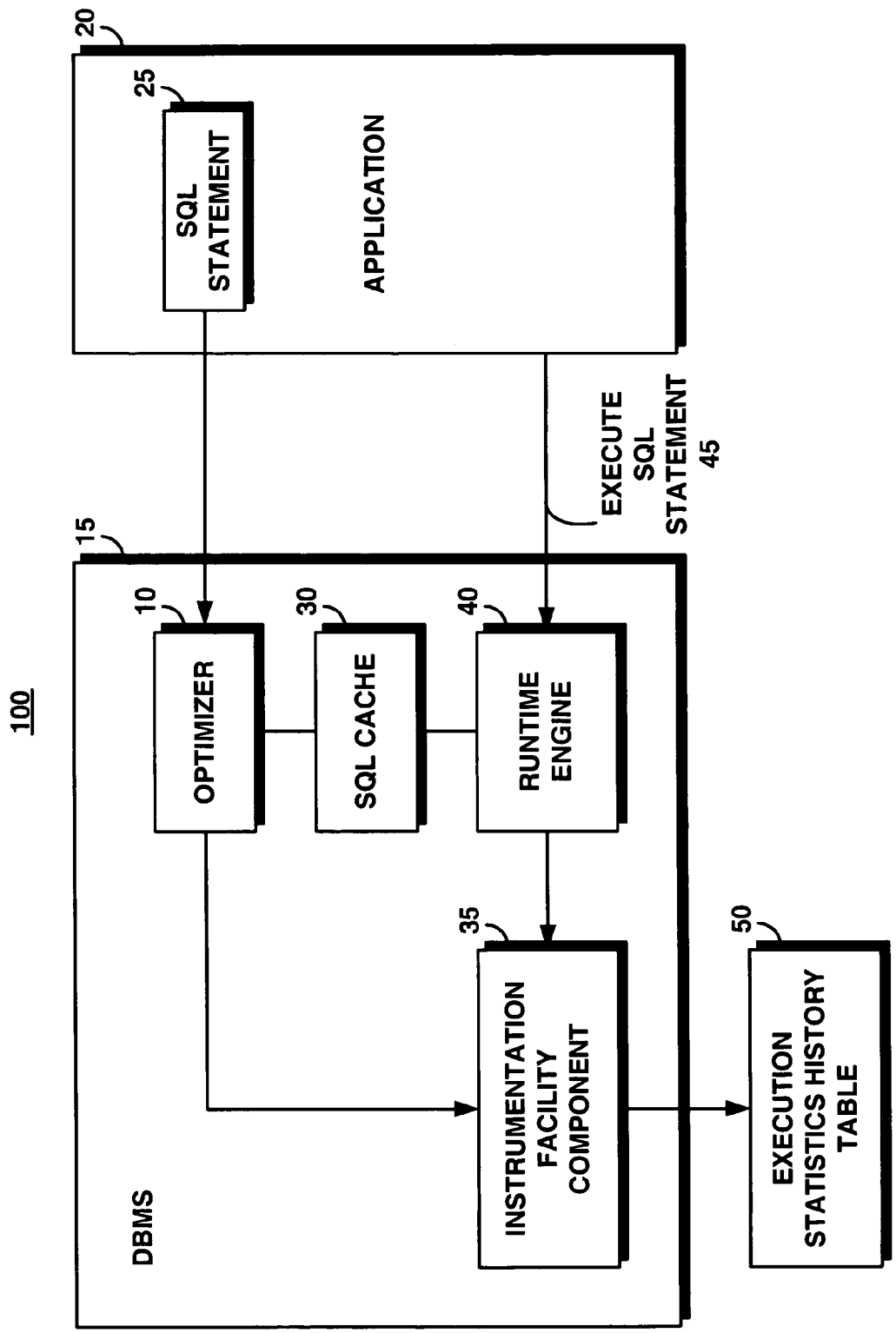
FIG. 1 is a schematic illustration of an exemplary operating system in which a system for performing a query to retrieve data from a database according to the present invention can be used.

FIG. 1 portrays an exemplary high-level architecture of a computer system 100 in which a system and associated method (the optimizer "10") for performing and optimizing an execution of a query using statistical values about the execution of the query collected during query execution can be used. Optimizer 10 includes a software programming code or computer program product that is typically embedded within, or installed on a computer. Alternatively, optimizer 10 can be saved on a suitable storage medium such as a diskette, a CD, a hard drive, or like devices.

Computer system 100 comprises a database management system (DBMS) 15, which, in turn, comprises optimizer 10. Queries are generated by an application 20 as, for example, SQL statement 25. The SQL statement 25 is fed to optimizer 10. The SQL statement 25 may be new to the DBMS 15. Alternatively, the SQL statement 25 may be known to the DBMS 15, having been previously executed and stored in the SQL cache 30. The computer system 100 further comprises a processor (CPU), a hardware memory, and computer-readable storage medium such as a diskette, a CD, a hard drive, or like devices.

For the SQL statement 25 that is new to the DBMS 15, the optimizer 10 generates an SQL access path (also referenced herein as a query execution plan or QEP) for the SQL statement 25. The optimizer 10 writes the QEP to the SQL cache 30 where the QEP is stored. The SQL statement 25 that is known to the DBMS 15 has an associated QEP that has been previously generated and stored in the SQL cache 30. The optimizer 10 reads from the SQL cache 30 the associated QEP for the SQL statement 25 that is known to the DBMS 15.

Figure 2A:
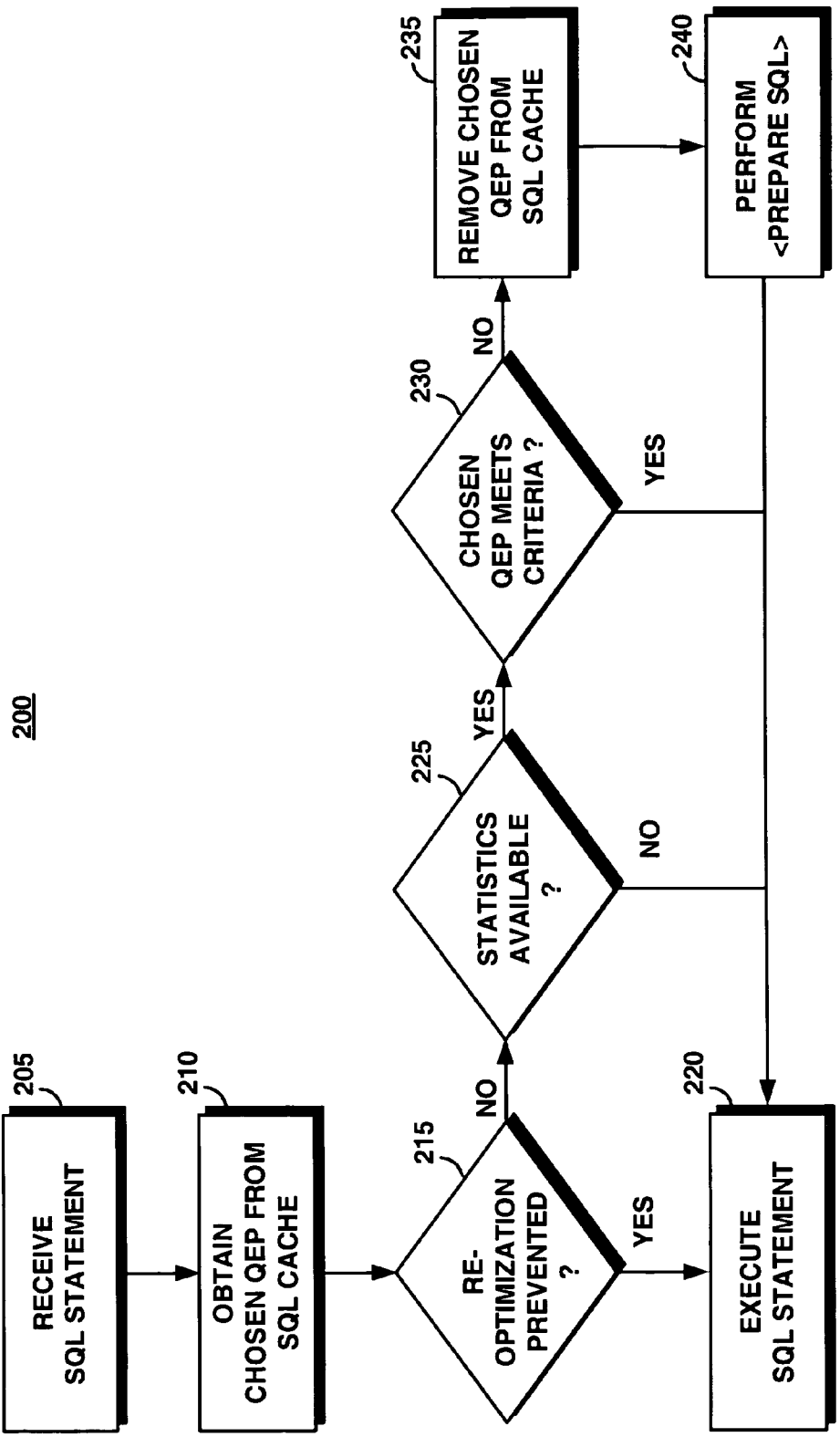
FIG. 2 is comprised of FIGS. 2A and 2B and represents a process flow chart flow chart of the query optimization process performed by the computer system shown in FIG. 1.
Figure 2B:
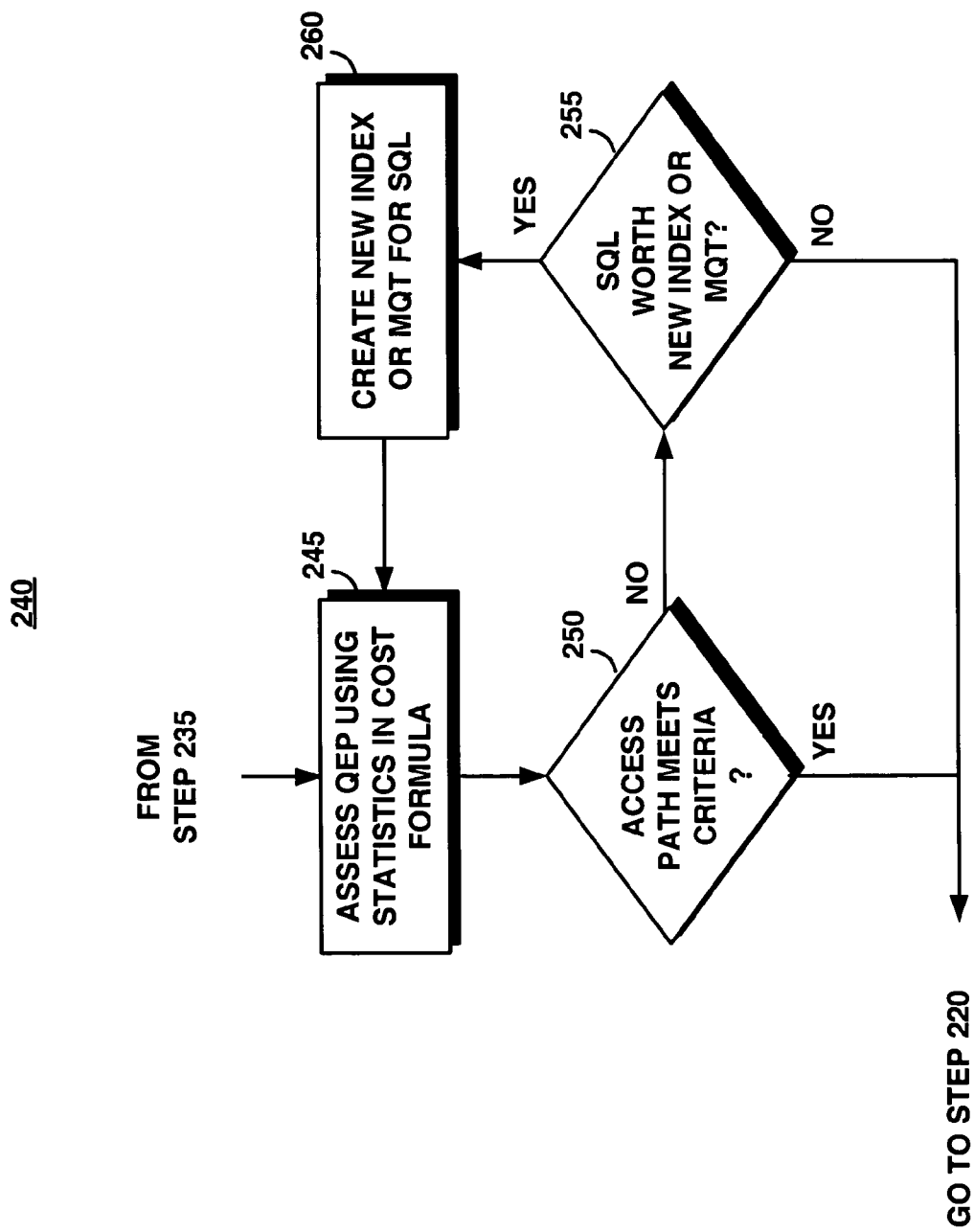

FIG. 2 (FIGS. 2A and 2B) illustrates a method 200 of operation of the optimizer 10. With further reference to FIG. 1, the optimizer 10 receives the SQL statement 25 at step 205. In the exemplary method 200, the SQL statement 25 is known to the DBMS 15. The optimizer 10 reads the QEP from the SQL cache 30 for the SQL statement 25 at step 210, obtaining a chosen QEP or access path. In decision step 215, the optimizer 10 checks whether re-optimization of the chosen QEP is prevented by determining whether the chosen QEP accesses an "excluded" table. In general, the optimizer 10 may exclude certain SQL statements from being taken into consideration for re-optimization because these SQL statements cannot benefit from re-optimization. For example, SQL statements that access tables with constant very low cardinality or SQL statements that access specific tables for which standard query optimization rules do not apply (e.g., queue tables) may not benefit from re-optimization. If re-optimization is prevented in decision step 215, the SQL statement 25 is executed in step 220 according to the chosen QEP.

If re-optimization is not prevented at decision step 215, the optimizer 10 accesses an instrumentation facility component 35 to read statistical information about preceding executions of the SQL statement 25 according to the chosen QEP. This access operation is indicated by decision step 225. If no statistical information is available for the chosen QEP at decision step 225, the SQL statement is executed in step 220 according to the chosen QEP.

If appropriate statistical information is available at decision step 225, this information is used to assess the performance of the chosen QEP by assessing the access path at decision step 230. Assessment of the access path is typically performed by feeding the statistical values to a query assessment formula such as, for example, the ratio (# of rows examined/# of qualifying rows), (# of Getpages/# of qualifying rows), or (# of qualifying rows/# of qualifying rows after aggregate function).

If the result of this assessment is considered satisfactory by meeting predetermined performance criteria, the SQL statement is executed in step 220 according to the chosen QEP. If the result of the assessment is considered not satisfactory by not meeting predetermined performance criteria, the chosen QEP is removed from the SQL cache 30 in step 235. Re-optimization of the access path is initiated in step 240 by an <SQL prepare> process, creating a new QEP; the new QEP is optimized or re-optimized with respect to the previous chosen QEP. The chosen SQL statement is executed in step 220 of according to the new QEP.

In the here described example, re-optimization is performed by a second access to the SQL cache 30. FIG. 2B shows the re-optimization method of step 240 of FIG. 2A in detail. In step 245, the chosen QEP in the re-optimization process is assessed by using the execution statistics in an assessment formula (also referenced as cost formula) of the DBMS 15, as the ratio (# of rows examined/# of qualifying rows), (# of Getpages/# of qualifying rows), or (# of qualifying rows/# of qualifying rows after aggregate function). In decision step 250, the optimizer 10 checks whether the result of this assessment is satisfactory (i.e., meeting predetermined performance criteria) such that the SQL statement can be executed according to the chosen QEP. If the result of the assessment of the access path is not satisfactory (i.e., not meeting predetermined criteria) the re-optimization method checks in decision step 255 whether sufficient performance improvements achieved in executing the SQL statement are worth the cost of creating a new index or MQT. Worth is determined, for example, by evaluating the number of previous executions or by comparing the elapsed time of the previous executions with the overall time of all executions of all statements in the SQL cache 30. If performance improvements are worth creation of a new index or MQT at decision step 215, a new index or MQT is created in step 260 and the re-optimization process starts over on the bases of the newly created index or MQT.

Either the chosen QEP or the new QEP for the SQL statement 25 is stored in the SQL cache 30. To initiate the execution of the SQL statement 25 according to the new QEP or the chosen QEP, the runtime engine 55 of the DBMS 15 receives a corresponding order to execute SQL statement (45) from the application 20.

During execution of the SQL statement 25, the instrumentation facility component 35 collects statistical values about the execution of the SQL statement 25. An execution statistics history table 50 is created that persistently stores the execution statistics of SQL statements. During the execution of the SQL statement 25, the statistical values are collected in main memory (not shown) of the computer system 100. When an SQL statement is cast out from dynamic statement cache or when it is invalidated, according to step 235 of FIG. 2A, the statistics gathered so far are externalized in a new row to the execution statistics history table 60. Consequently, a separate row exists for each new QEP. In order to allow the correlation of the execution statistics with future SQL statements, the text of the SQL statement is stored along with the statistics for the QEP associated with the SQL statement. To associate execution statistics with QEPs, the execution statistics history table 60 also comprises columns that describe the access path, as access method, employed index, join method, and join order.

When executing the SQL statement 25 according to step 220 of FIG. 2A, the counters and timers of the SQL statistics of this statement execution are initialized. The new QEP or the chosen QEP is implemented to retrieve data from the database according to the SQL statement 25. Thereby the counters and timers are updated. At completion of the execution of the SQL statement 25, the statistical values collected for the SQL statement 25 during execution are added to the SQL statistics in main memory of the computer system 100.

As described above, the optimizer 10 queries the execution statistics history table 50 and fetches the previously stored statistics of the SQL statement 25 during the generation of a QEP for the SQL statement 25. At least some and preferably all of the execution statistics of the SQL statement 25 that have previously been collected in main memory reside in the execution statistics history table 50. The optimizer 10 can exploit a wide variety of performance indicators, particularly system statistics, in its cost formula. These performance indicators comprise:

the number of executions,
the number of examined rows,
synchronous reads,
synchronous writes,
buffer reads,
buffer writes;
number of parallel groups,
record list failures,
# of sort operations,
# of getpage operations,
# of synchronous I/Os,
average synchronous I/O time,
average wait time for prefetched pages.

The statistics that the optimizer 10 considers are included in the cost formula. A high number of record ID list failures may make the optimizer 10 choose an access path that does not rely on record ID pools. This behaviour is intended to provide short-time relief for record ID pool contention. In addition, existing system statistics can be enhanced by those execution statistics that are more accurate. For example, the average synchronous I/O time from the execution statistics is more accurate than the default disk I/O time that some conventional optimizers use.

The optimizer 10 is able to use individual system values per query. This makes sense, because the disk I/O time for example can vary between different queries as the accessed tables possibly reside in disks with different I/O speeds. Moreover, the buffer pool hit ratio can be deduced from the base performance indicators. This allows the optimizer 10 to take the disk I/O operations that the buffer pools save for a specific query into consideration when generating a new QEP for the individual query.

In one embodiment, the execution statistics of the last interval are fed directly into the cost formula of the optimizer 10. In another embodiment, the optimizer 10 considers the entire history of execution statistics. A further embodiment of the optimizer 10 exploits the complete history of execution statistics to identify trends that allow even more accurate predictions of future behaviour, e.g. future buffer pool hit ratios can be forecasted.

As mentioned previously, the optimizer 10 checks whether the SQL statement should be re-optimized before executing a previously prepared statement. To accomplish this task, different metrics or assessment formulas can be employed. For this purpose, the current values maintained in main memory are examined rather than the values from the execution statistics history table 50. A sample metric is the ratio (# of rows examined/# of qualifying rows). If this ratio exceeds a certain threshold, the statement is invalidated and re-optimized.

If, during optimization, the best access path for a statement performs unsatisfactorily according to the execution statistics history, optimizer 10 attempts to define an index or MQT suitable for the given statement. The performance is considered unsatisfactory if the indicators available for the QEP that the optimizer generated were triggering re-optimization again. The index or MQT can be designed by approaches well known in the art such as the approaches being implemented by database index/MQT advisors.

What is claimed is:

1. A method of performing a query in a computer system to retrieve data from a database stored on the computer system which comprises a Data-Base Management System (DBMS) with an optimizer, the method comprising:

providing a processor and memory, wherein the memory stores one or more instructions for:
determining a Query Execution Plan (QEP) for the query;
assessing an access path of said QEP prior to each execution by applying a cost assessment formula using collected performance-related statement execution statistical values comprising performance data collected from one or more previous executions of said query according to said QEP;
a database process executing the query determining whether to choose said QEP or to generate a new QEP based on the results of the cost assessment formula using the collected performance-related statement execution statistical values;
generating the new QEP in response to determining that said QEP does not meet predetermined performance criteria;
creating one or more of new indexes, and Materialized Query Tables (MQTs) upon an assessment that the generated new QEP does not meet predetermined performance criteria;
executing said query according to a QEP selectively chosen using the collected performance-related statement execution statistical values and the new indexes;
collecting new performance-related statement execution statistical values during each execution of said query according to the chosen QEP, the new performance-related statement execution statistical values comprising performance data collected from the execution of said query and stored for optimizing an execution of future queries;
storing the collected new performance-related statement execution statistical values of said query according to said chosen QEP;
wherein the performance-related collected statement execution statistical values comprise performance data collected from one or more previous executions of said query accord to said QEP are accumulated in memory as long as the QEP is not invalidated for said query and wherein said collected statement execution statistical values are externalized in an initially created execution statistics history table when generating a new QEP for said query; and
wherein the performance-related collected statement execution statistical values collected during execution of the query comprises;
synchronous reads;
synchronous writes;
buffer reads;
buffer writes;
number of parallel groups;
record list failures;
I/O wait time;
wait time for refetched pages;
getpage operations;
number of examined rows;
number of qualifying rows;
number of get pages;
number of qualifying rows after application of aggregate functions; and
synchronous I/Os.

2. The method according to claim 1, wherein the optimizer comprises the cost assessment formula, the cost assessment formula controlling the generation of the QEP for said query by feeding the performance-related collected statement execution statistical values comprising performance data collected from one or more previous executions of said query according to said QEP into the cost assessment formula of the optimizer.

3. The method according to claim 1, wherein the collected performance-related statement execution statistical values comprising performance data collected from one or more previous executions of said query according to said QEP are persistently stored for use in identifying a trend and an effect of access path changes.

4. The method according to claim 1, wherein a statement text of said query and a QEP description are stored with corresponding collected performance-related statement execution statistical values in the execution statistics history table.

5. The method of claim 1, wherein the cost assessment formula comprises at least one of: a ratio of number of rows examined to number of qualifying rows, a ratio of number of Getpages to number of qualifying rows, and a ratio of number of qualifying rows to number of qualifying rows after aggregate function.

6. A computer program product having executable instruction codes stored on a computer-readable storage medium are executing on a processor to retrieve data from a database, the executable instruction codes comprising:

determining a Query Execution Plan (QEP) for the query;

assessing an access path of said QEP prior to each execution by applying a cost assessment formula using collected performance-related statement execution statistical values comprising performance data collected from one or more previous executions of said query according to said QEP;

a database process executing the query determining whether to choose said QEP or to generate a new QEP based on the results of the cost assessment formula using the collected performance-related statement execution statistical values;

generating the new QEP in response to determining that said QEP does not meet predetermined performance criteria;

creating one or more of new indexes, and Materialized Query Tables (MQTs) upon an assessment that the generated new QEP does not meet predetermined performance criteria;

executing said query according to a QEP selectively chosen using the collected performance-related statement execution statistical values and the new indexes;

collecting new performance-related statement execution statistical values during each execution of said query according to the chosen QEP, the new performance-related statement execution statistical values comprising performance data collected from the execution of said query and stored for optimizing an execution of future queries;

storing the collected new performance-related statement execution statistical values of said query according to said chosen QEP;

wherein the performance-related collected statement execution statistical values comprise performance data collected from one or more previous executions of said query according to said QEP are accumulated in memory as long as the QEP is not invalidated for said query and wherein said collected statement execution statistical values are externalized in an initially created execution statistics history table when generating a new QEP for said query; and wherein the performance-related collected statement execution statistical values collected during execution of the query comprises:

synchronous reads;
    synchronous writes;
    buffer reads;
    buffer writes;
    number of parallel groups;
    record list failures;
    I/O wait time;
    wait time for refetched pages;
    getpage operations;
    number of examined rows;
    number of qualifying rows;
    number of get pages;
    number of qualifying rows after application of aggregate functions; and
    synchronous I/Os.

7. The computer program product of claim 6, wherein the optimizer comprises the cost assessment formula, the cost assessment formula controlling the generation of the QEP for said query by feeding the performance-related collected statement execution statistical values comprising performance data collected from one or more previous executions of said query according to said QEP into the cost assessment formula of the optimizer.

8. The computer program product of claim 6, wherein the collected performance-related statement execution statistical values comprising performance data collected from one or more previous executions of said query according to said QEP are persistently stored for use in identifying a trend and an effect of access path changes.

9. The computer program product of claim 6, wherein a statement text of said query and a QEP description are stored with corresponding collected performance-related statement execution statistical values in the execution statistics history table.

10. A system for performing a query in a computer system to retrieve data from a database stored on the computer system which comprises a Database Management System (DBMS) with an optimizer, the system comprising:

a DBMS comprising an optimizer for generating, assessing, and re-optimizing a Query Execution Plan (QEP) for a given query, the DBMS executing on a computer system comprising a processor and a computer-readable storage medium;

one or more instructions stored in the computer-readable storage medium and executable by the processor for:

determining a Query Execution Plan (QEP) for the query;

assessing an access path of said QEP prior to each execution by applying a cost assessment formula using collected performance-related statement execution statistical values comprising performance data collected from one or more previous executions of said query according to said QEP;

a database process executing the query determining whether to choose said QEP or to generate a new QEP based on the results of the cost assessment formula using the collected performance-related statement execution statistical values;

generating the new QEP in response to determining that said QEP does not meet predetermined performance criteria;

creating one or more of new indexes, and Materialized Query Tables (MQTs) upon an assessment that the generated new QEP does not meet predetermined performance criteria;

executing said query according to a QEP selectively chosen using the collected performance-related statement execution statistical values and the new indexes;

collecting new performance-related statement execution statistical values during each execution of said query according to the chosen QEP, the new performance-related statement execution statistical values comprising performance data collected from the execution of said query and stored for optimizing an execution of future queries;

storing the collected new performance-related statement execution statistical values of said query according to said chosen QEP;

wherein the performance-related collected statement execution statistical values comprise performance data collected from one or more previous executions of said query according to said QEP are accumulated in memory as long as the QEP is not invalidated for said query and wherein said collected statement execution statistical values are externalized in an initially created execution statistics history table when generating a new QEP for said query; and wherein the performance-related collected statement execution statistical values collected during execution of the query comprises:

synchronous reads;
synchronous writes;
buffer reads;
buffer writes;
number of parallel groups;
record list failures;
I/O wait time;
wait time for refetched pages;
getpage operations;
number of examined rows;
number of qualifying rows;
number of get pages;
number of qualifying rows after application of aggregate functions; and
synchronous I/Os.

11. The system of claim 10, wherein the optimizer comprises the cost assessment formula, the cost assessment formula controlling the generation of the QEP for said query by feeding the performance-related collected statement execution statistical values comprising performance data collected from one or more previous executions of said query according to said QEP into the cost assessment formula of the optimizer.

12. The system of claim 10, wherein the collected performance-related statement execution statistical values comprising performance data collected from one or more previous executions of said query according to said QEP are persistently stored for use in identifying a trend and an effect of access path changes.

13. The system of claim 10, wherein a statement text of said query and a QEP description are stored with corresponding collected performance-related statement execution statistical values in the execution statistics history table.

* * * * *